US009264985B2

(12) United States Patent
Pica et al.

(10) Patent No.: US 9,264,985 B2
(45) Date of Patent: Feb. 16, 2016

(54) APPARATUS AND METHODS OF CONTROLLING CALL ESTABLISHMENT

(71) Applicant: QUALCOMM Incorporated, San Diego, CA (US)

(72) Inventors: Francesco Pica, San Diego, CA (US); Gavin Bernard Horn, La Jolla, CA (US); Rohit Kapoor, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 13/954,771

(22) Filed: Jul. 30, 2013

(65) Prior Publication Data

US 2014/0133304 A1 May 15, 2014

Related U.S. Application Data

(60) Provisional application No. 61/726,400, filed on Nov. 14, 2012.

(51) Int. Cl.
*H04W 48/20* (2009.01)
*H04W 88/06* (2009.01)
*H04W 28/08* (2009.01)
*H04W 76/02* (2009.01)

(52) U.S. Cl.
CPC .............. *H04W 48/20* (2013.01); *H04W 28/08* (2013.01); *H04W 76/027* (2013.01); *H04W 88/06* (2013.01)

(58) Field of Classification Search
None
See application file for complete search history.

(56) References Cited

U.S. PATENT DOCUMENTS

| 2005/0147068 | A1* | 7/2005 | Rajkotia ........................ 370/338 |
| 2007/0054684 | A1* | 3/2007 | Ferzali et al. .................. 455/515 |
| 2007/0265003 | A1* | 11/2007 | Kezys et al. ................. 455/435.1 |
| 2008/0019333 | A1* | 1/2008 | Kharia et al. .................. 370/338 |
| 2008/0075033 | A1* | 3/2008 | Shattil ............................ 370/328 |
| 2010/0304738 | A1* | 12/2010 | Lim ........................... 455/426.1 |
| 2010/0323698 | A1* | 12/2010 | Rune et al. .................... 455/436 |
| 2011/0053597 | A1 | 3/2011 | Lee et al. |
| 2011/0188425 | A1* | 8/2011 | Rydnell ................ H04W 40/00 370/311 |
| 2012/0315905 | A1* | 12/2012 | Zhu et al. ...................... 455/436 |

(Continued)

OTHER PUBLICATIONS

3GPP TR 37.834 V0.3.0 $3^{rd}$ Generation Partnership Project; Technical Specification Group Radio Access Network; Study on WLAN/3GPP Radio Interworking (Release 12), May 2013.

(Continued)

*Primary Examiner* — Benjamin H Elliott, IV
(74) *Attorney, Agent, or Firm* — Darren M. Simon

(57) ABSTRACT

Apparatus and methods of controlling call establishment are described. A user equipment (UE) may determine to establish a call. In an aspect, the UE may detect a Wireless Local Area Network (WLAN) access node and receive, from a Wireless Wide Area Network (WWAN) access node, WWAN load-related information. Based on UE call establishment rules and the WWAN load-related information, the UE may determine whether to establish the call on the WWAN access node or the WLAN access node. In another aspect, the UE may determine WLAN access node characteristics associated with a received signal from a WLAN access node. The UE may forward a call establishment request, including the WLAN access node characteristics to a WWAN access node. The UE may receive a redirection command to redirect the call establishment request to the WLAN access node.

24 Claims, 8 Drawing Sheets

(56) References Cited

U.S. PATENT DOCUMENTS

| | | | |
|---|---|---|---|
| 2013/0040638 A1 | 2/2013 | George et al. | |
| 2013/0083661 A1* | 4/2013 | Gupta et al. | 370/235 |
| 2013/0083783 A1* | 4/2013 | Gupta et al. | 370/338 |
| 2014/0133304 A1* | 5/2014 | Pica et al. | 370/232 |

OTHER PUBLICATIONS

Ericsson, ST-Ericsson, and Orange, WLAN/3GPP Radio Interworking—More on Idle and Connected mode, 3GPP TSG-RAN WG2 #2, May 20-24, 2013.

International Search Report and Written Opinion—PCT/US2013/069825—ISA/EPO—Apr. 24, 2014.

ZTE: "3GPP TSG SA WG2 Meeting #94, S2-124285, Access Network selection based on WLAN Load information", 3GPP Draft, S2-124285-WLAN Load Solution, 3rd Generation Partnership Project (3GPP), Mobile Competence Centre, 650, Route Des Lucioles, F-06921 Sophia-Antipolis Cedex, France vol. SA WG2, no. New Orleans, USA, 20121112-20121116 Nov. 6, 2012, XP050683953, Retrieved from the Internet: URL: http://www.3gpp.org/ftp/tsgsa/WG2Arch/TSGS294New0rleans/Docs/ "retrieved on Nov. 6, 2012, the whole document".

* cited by examiner

APPARATUS AND METHODS OF CONTROLLING CALL ESTABLISHMENT

CLAIM OF PRIORITY UNDER 35 U.S.C. §119

The present application for patent claims priority to Provisional Application No. 61/726,400 entitled "APPARATUS AND METHODS OF CONTROLLING CALL ESTABLISHMENT" filed Nov. 14, 2012, and assigned to the assignee hereof.

BACKGROUND

1. Field

Aspects of the present disclosure relate generally to wireless communication systems, and more particularly, apparatus and methods of controlling call establishment.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

It may be desirable for a radio access network (RAN) Node, such as a cellular or Wireless Wide Area Network (WWAN) base station or NodeB, to offload traffic to another radio access technology (RAT) access node, such as a WiFi or Wireless Local Area Network (WLAN) access point, capable of supporting the traffic. Existing solutions include a network access stratum (NAS)-based function, referred to as an access network domain selection function (ANDSF), and upper layer/operating system (OS)-based functions. Such existing solutions make determinations based on static rules for call establishment.

As such, in such conventional systems, it is not possible to control, from within the cellular RAN, an idle UE that is camping on the cellular network, in order to direct the idle UE to establish a new packet-switched (PS) call using, for example, a WiFi access point, rather than a cellular access point. Similar issues exist for UEs in some reselection states in, for example, UMTS. In other words, a UE cannot be dynamically directed to establish a call using a non-cellular-based access point in order to offload new traffic related to a newly-established call from the RAN node when possible.

Thus, improvements in call establishment are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of controlling call establishment is described. The method may include determining, at a user equipment, to establish a call. The method may include detecting a Wireless Local Area Network (WLAN) access node. The method may include receiving, from a Wireless Wide Area Network (WWAN) access node, WWAN load-related information. The method may include determining, based on user equipment call establishment rules and based on the WWAN load-related information, whether to establish the call on the WWAN access node or the WLAN access node.

In an aspect, a computer program product for controlling call establishment is described. The computer program product may include a computer-readable medium that includes code. The code may cause a computer to determine, at a user equipment, to establish a call. The code may cause a computer to detect a Wireless Local Area Network (WLAN) access node. The code may cause a computer to receive, from a Wireless Wide Area Network (WWAN) access node, WWAN load-related information. The code may cause a computer to determine, based on user equipment call establishment rules and based on the WWAN load-related information, whether to establish the call on the WWAN access node or the WLAN access node.

In an aspect, an apparatus for controlling call establishment is described. The apparatus may include means for determining, at a user equipment, to establish a call. The apparatus may include means for detecting a Wireless Local Area Network (WLAN) access node. The apparatus may include means for receiving, from a Wireless Wide Area Network (WWAN) access node, WWAN load-related information. The apparatus may include means for determining, based on user equipment call establishment rules and based on the WWAN load-related information, whether to establish the call on the WWAN access node or the WLAN access node.

In an aspect, an apparatus for controlling call establishment is described. The apparatus may include a call establishment component configured to determine, at a user equipment, to establish a call. The apparatus may include an access node detector configured to detect a Wireless Local Area Network (WLAN) access node, and receive, from a Wireless Wide Area Network (WWAN) access node, WWAN load-related information. The apparatus may include a radio access technology (RAT) determiner configured to determine, based on user equipment call establishment rules and based on the WWAN load-related information, whether to establish the call on the WWAN access node or the WLAN access node.

In an aspect, a method of controlling call establishment is described. The method may include determining to establish a call. The method may include determining Wireless Local Area Network (WLAN) access node characteristics associated with a received signal from a WLAN access node. The method may include forwarding a call establishment request including the WLAN access node characteristics to a Wireless Wide Area Network (WWAN) access node. The method may include receiving a redirection command to redirect the call establishment request to the WLAN access node.

In an aspect, a computer program product for controlling call establishment is described. The computer program product may include a computer-readable medium that includes code. The code may cause a computer to determine to establish a call. The code may cause a computer to determine Wireless Local Area Network (WLAN) access node characteristics associated with a received signal from a WLAN access node. The code may cause a computer to forward a call establishment request including the WLAN access node characteristics to a Wireless Wide Area Network (WWAN) access node. The code may cause a computer to receive a redirection command to redirect the call establishment request to the WLAN access node.

In an aspect, an apparatus for controlling call establishment is described. The apparatus may include means for determining to establish a call. The apparatus may include means for determining Wireless Local Area Network (WLAN) access node characteristics associated with a received signal from a WLAN access node. The apparatus may include means for forwarding a call establishment request including the WLAN access node characteristics to a Wireless Wide Area Network (WWAN) access node. The apparatus may include means for receiving a redirection command to redirect the call establishment request to the WLAN access node.

In an aspect, an apparatus for controlling call establishment is described. The apparatus may include a call establishment component configured to determine to establish a call. The apparatus may include an access node detector configured to determine Wireless Local Area Network (WLAN) access node characteristics associated with a received signal from a WLAN access node. The call establishment component also may be configured to forward a call establishment request including the WLAN access node characteristics to a Wireless Wide Area Network (WWAN) access node, and receive a redirection command to redirect the call establishment request to the WLAN access node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
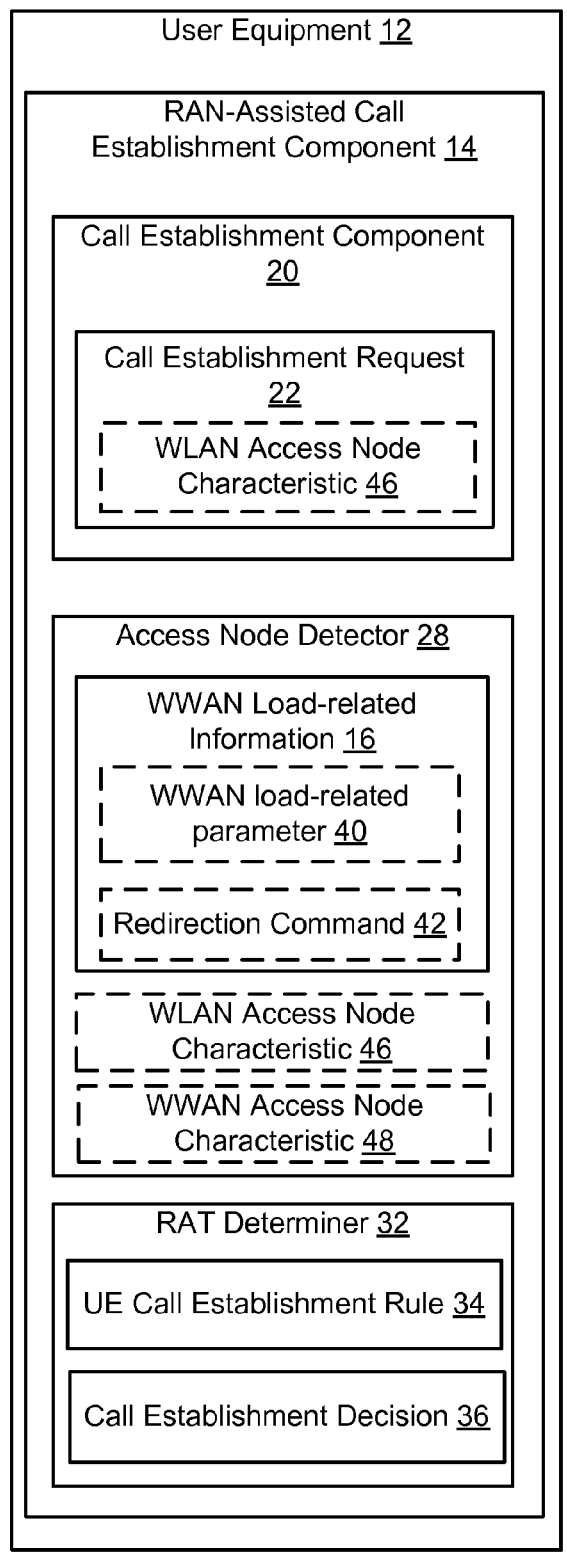
FIG. 1 is schematic diagram of a wireless communication system including a user equipment (UE) having an aspect of a searcher component as described herein.
Figure 1:
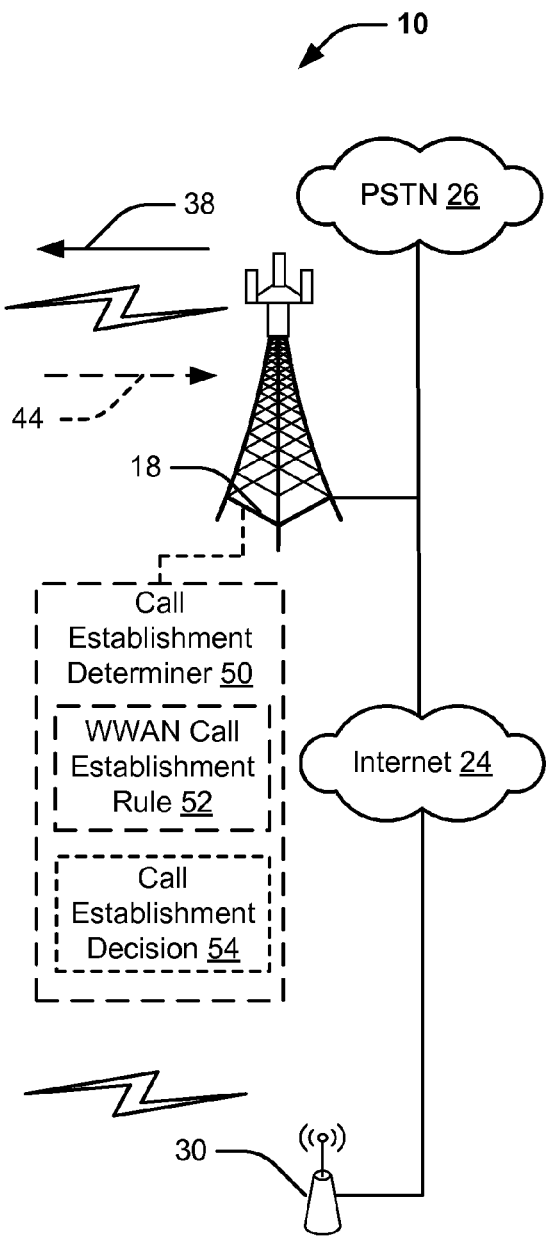

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present apparatus and methods provide a user equipment (UE) with a radio access network (RAN)-assisted call establishment component and/or algorithm that enables a call establishment procedure to be directed, at least in part, based on load-related information at a cellular or Wireless Wide Area Network (WWAN) access node, which may be, for example, a base station and/or Node B. Specifically, based on the operation of the present apparatus and methods, the UE may determine, or may be directed, to establish a call on either the cellular or Wireless Wide Area Network (WWAN) access node or a different technology access node, such as a WiFi or Wireless Local Area Network (WLAN) access node, capable of supporting the call based at least in part on load-related information at the cellular or WWAN access node. The apparatus and methods described herein may be helpful, for example, in controlling a packet switched (PS) call establishment of a UE in idle mode and camped on a cellular or WWAN access node. The apparatus and method described herein also may be helpful, for example, in controlling call establishment related to a UE in connected mode with a WWAN access node by evaluating switching an existing call to a WLAN access node or maintaining the existing call on the WWAN access node but establishing a new call on a WLAN access node, based at least in part on load-related information at the cellular or WWAN access node. For instance, in an aspect, the UE may keep an existing call (e.g., related to Web Browsing) on a WWAN access node but start a new call (e.g., a Voice over Internet Protocol (VoIP) call) on a WLAN access node. As such, in some aspects, the present apparatus and methods may provide an efficient solution, as compared to current solutions, by avoiding setup of a radio bearer over a cellular/WWAN access node when it can be determined to setup the call with the WLAN access node based at least in part on load at the WWAN access node.

Thus, the present apparatus and methods include two mechanisms to control call establishment, which may be used separately, in combination, and/or with other components and functionality. The two mechanisms include controlling establishment of a packet switched (PS) call by a UE in idle mode and camped on a WWAN access node, (1) before the UE sends the connectivity (RRC connection) request, or (2) during the (RRC) connection setup.

A first case includes, for example, WWAN (e.g., cellular)/WLAN (e.g. WiFi) selection at PS call setup based on RAN-assisted broadcast information. For instance, a UE in idle mode (or cell paging channel (PCH) mode in UMTS) may be configured to setup a new PS call in WWAN (e.g., cellular) or WLAN (e.g., WiFi), switch an existing call to WLAN, and/or maintain an existing call on WWAN while a new call is evaluated for establishment with the WLAN access node. The UE may perform any of these aspects based on one or more of the following factors: (i) WWAN broadcast information, such as, for example, a current load, which may be described, for example, in terms of downlink (DL) resources utilization (e.g., power, percent transmission time interval (TTI), synchronization codes, resource blocks (RB) or the like), uplink (UL) Noise Rise or load-factor, and/or DL/UL Throughput; (ii) WLAN current load (or other information defined in Hotspot (HS) 2.0, which is a WiFi enhancement standard specified by WiFi Alliance, https://www.wi-fi.org/knowledge-center/published-specifications, which is incorporated by reference herein) or alternatively some minimum WLAN entry criteria and/or thresholds based on HS 2.0 parameters; (iii) one or more WWAN radio frequency (RF) quality thresholds (e.g., minimum criteria for leaving cellular); (iv) one or more WLAN RF quality thresholds (e.g., a minimum entry criteria for WiFi); (v) a flag to indicate a preference to setup any PS call on WLAN (if detected), regardless of WWAN/WLAN load and/or quality; and (vi) UE-stored rules or policies such as, for example, cellular load thresholds to determine whether to setup a PS call on WLAN (based on the WWAN broadcast load information), which may be per-cell (all UEs), per-UE and/or per-service.

In an aspect, this solution may be helpful in reducing signaling load and data interruption and/or latency, by, for example, dynamically avoiding connecting to WWAN by being moved to WLAN either during PS call setup or right after PS call setup. For example, such dynamic functionality may be performed by, using UE measurement reports and/or network handover and/or offload commands. In another aspect, this solution may allow for scaling the same functionality up to accommodate a large number of idle and/or connected UEs. Additionally, as noted above, the above-described solution also may be used for connected mode UEs, e.g., to trigger UEs to switch PS connectivity from WWAN to WLAN.

A second case includes, for example, WWAN (e.g., cellular) to WLAN (e.g., WiFi) redirection at PS call setup based on WLAN characteristics reported to the WWAN access node by the UE. For example, offloading of call establishment to the WLAN access node at radio resource control (RRC) and/or PS-call setup can be achieved using a call redirection from WWAN to WLAN procedure. For instance, and according to this case, a UE may report WiFi measurements (or other information, see, e.g., Table 1, below) in an RRC Connection Request. A redirection command (e.g., an RRC Connection Reject) from the network to the UE may include target WiFi access points (AP) and/or other information (e.g., maximum WiFi search time, indication to return to WWAN in connected mode, or the like). Further, in some aspects, such a redirection command could be rejected by the UE based on local rules and/or policies (e.g., a preference for home WiFi or other user settings, or the like).

The following Table 1 lists a summary of potential information elements (IEs) that could be reported by the UE in the RRC Connection Request message of this second case.

TABLE 1

Potential IEs reported by a UE in RRC measurement report

| Information Element | Availability in WLAN |
| --- | --- |
| BSSID | Beacon or Probe Response |
| SSID | Beacon or Probe Response |
| HESSID | Beacon or Probe Response (802.11u) |
| Operating class, channel number | Measurement |
| 3GPP Cellular Network Info | ANQP (802.11u) |

TABLE 1-continued

Potential IEs reported by a UE in RRC measurement report

| Information Element | Availability in WLAN |
| --- | --- |
| Received Channel Power Indicator (RCPI) | Measurement |
| Received Signal to Noise Indicator (RSNI) | Measurement |
| Channel load | Measurement |
| WAN metrics | ANQP (HS 2.0) |
| BSS load | Beacon or Probe Response (802.11k) |
| alreadyConnected | Set to 1 if already connected to this BSSID, SSID or HESSID |

Thus, the present apparatus and methods provide a user equipment (UE) with a radio access network (RAN)-assisted call establishment component and/or algorithm that enables a call establishment procedure to be dynamically directed, at least in part, based on current load-related information at a cellular or Wireless Wide Area Network (WWAN) access node.

Referring to FIG. 1, in an aspect, a wireless communication system 10 includes a user equipment (UE) 12 having a radio access network (RAN)-assisted call establishment component 14 configured to control call establishment for UE 12 based at least in part on Wireless Wide Area Network (WWAN) load-related information 16 at a cellular or WWAN access node 18. As used herein, the terms "controlling establishing of a call" or "controlling call establishment" may refer to controlling an initial set up of a connection with an access node in order to carry and maintain a call over the connection. As such, the present apparatus and methods may be implemented by UE 12 when it is in idle mode and initially preparing to setup a call, and/or by UE 12 when it is in a connected mode and evaluating whether to establish a new call on a WLAN access node, based on a load at a WWAN access node.

For example, RAN-assisted call establishment component 14 may include a call establishment component 20 configured to determine a need to establish a call. For example, an application (not shown) executing on UE 12 may generate a call establishment request 22 for access to a communication interface to communicate with a destination, such as another device on a network, a packet switched network like the Internet 24, and/or a circuit switched network like a public switched telephone network (PSTN) 26. In another example, when a call or connection is already established, call establishment request 22 may relate to a request to send data, e.g., based on a new application being activated or a new request to send data from an existing (currently executing) application. In either case, the present apparatus and methods may provide an efficient solution, as compared to current solutions, by avoiding setup of a radio bearer over cellular/WWAN access node when it can be determined to setup the call with the WLAN access node.

Further, RAN-assisted call establishment component 14 may include an access node detector 28 configured to determine availability and suitability of both WWAN access node 18 and a WiFi or Wireless Local Area Network (WLAN) access node 30 for establishing a call.

RAN-assisted call establishment component 14 also may include a Radio access technology (RAT) determiner 32. In response to call establishment request 22, RAT determiner 32 may be configured to control call establishment on WWAN access node 18 or WLAN access node 30 based at least in part on WWAN load-related information 16. For example, and in an aspect, UE 12 may receive a message 38 from WWAN access node 18, wherein message 38 includes WWAN load-related information 16. In another aspect, UE 12 may determine WWAN load-related information 16 by detection or determination, receiving some other message(s) or indication(s), and/or the like.

RAT determiner 32 may use one or more UE call establishment rules 34, along with WWAN load-related information 16, to generate a call establishment decision 36. Call establishment decision 36 may direct call establishment component 20 to establish the call on either WWAN access node 18 or WLAN access node 30 based on the decision (e.g., based, at least in part, on the UE call establishment rules 34 and WWAN load-related information 16).

As noted above, and in an aspect, UE 12 may receive a message 38 from WWAN access node 18, wherein message 38 includes WWAN load-related information 16. In a first case, for instance, message 38 may be a broadcast message having WWAN load-related information 16 in the form of one or more WWAN load-related parameters 40. For example, WWAN load-related parameters 40 may include, but is not limited to, one or more of a downlink (DL) resources utilization, an uplink (UL) Noise Rise or load-factor, a DL/UL throughput parameter, a current number of users parameter, an available power value, and a number of primary synchronization codes, a relative load indicator such as a low load indicator, a medium load indicator, and a high load indicator, a single bit such that a value of the single bit indicates loaded or not loaded and/or some other indication as to whether or not to establish a call on WWAN access node 18 or WLAN access node 30.

In this first case, RAT determiner 32 utilizes one or more WWAN load-related parameters 40 as an input when using one or more UE call establishment rules 34 in order to generate call establishment decision 36. For example, RAT determiner 32 may use one or more UE call establishment rules 34 to compare one or more WWAN load-related parameters 40 to a corresponding parameter threshold to determine if WWAN access node 18 has a high enough load to dictate offloading the call establishment to WLAN access node 30. In another example, UE call establishment rules 34 may be a function that weighs one or more WWAN load-related parameters 40 to generate an output value that can be compared to a threshold that dictates whether to offload the call establishment to WLAN access node 30.

In a second case, for instance, message 38 may be a broadcast or a unicast message having WWAN load-related information 16 in the form of a redirection command 42. For example, redirection command 42 may be an explicit command to redirect call establishment to occur with WLAN access node 30. As such, the application of UE call establishment rules 34 may include recognizing redirection command 42 and overriding any other considerations, such that call establishment decision 36 may be generated to cause call establishment to occur with WLAN access node 30.

In this second case, for example, UE 12 may initially have directed call establishment request 22 to WWAN access node 18 in a call establishment request message 44, which may include one or more WLAN access node characteristics 46 determined by access node detector 28. For instance, the one or more WLAN access node characteristics 46 may include, but is not limited to, one or more of a WLAN access node identifier, a WLAN access node received signal strength, a WLAN access node quality of service, a WLAN access node list of available services, and/or the like. Optionally, call establishment request message 44 may also include one or more WWAN access node characteristics 48, such as received signal strength or other parameters that may be included in a typical UE measurement report. As such, redirection command 42 may be generated as a result of WWAN access node 18 executing functionality performed by a call establishment determiner 50. Specifically, call establishment determiner 50 may be configured to use one or more WWAN call establishment rules 52 that, itself, uses one or more WLAN access node characteristics 46, and/or one or more WWAN access node characteristics 48, received from UE 12 in combination with one or more WWAN load-related parameters 40 to generate call establishment decision 54. Call establishment decision 54 indicates whether to establish the call on WWAN access node 18 or WLAN access node 30. Thus, when call establishment decision 54 indicates to establish the call on WLAN access node 30, then call establishment determiner 50 generates message 38, including redirection command 42, to be broadcast or unicast to UE 12.

It should be noted that in either case, for example, WWAN load-related information 16, in the form of one or more WWAN load-related parameters 40 or in the form of redirection command 42, according to the present apparatus and methods include, WWAN load-related information 16 is dynamically variable. In an example, WWAN load-related information 16 may be dynamically variable as a function of a current load-based state of WWAN access node 18. As such, the present apparatus and methods may provide real time or near-real time, and highly configurable and flexible, control over call establishment at WWAN access node 18.

Thus, based on the foregoing aspects of the present apparatus and methods, UE 12, via RAN-assisted call establishment component 14, may be configured to dynamically control call establishment for UE 12 based at least in part on WWAN load-related information 16 at WWAN access node 18, thereby allowing highly flexible control over offloading of call establishment to other access nodes, such as WLAN access node 30.

Figure 2:
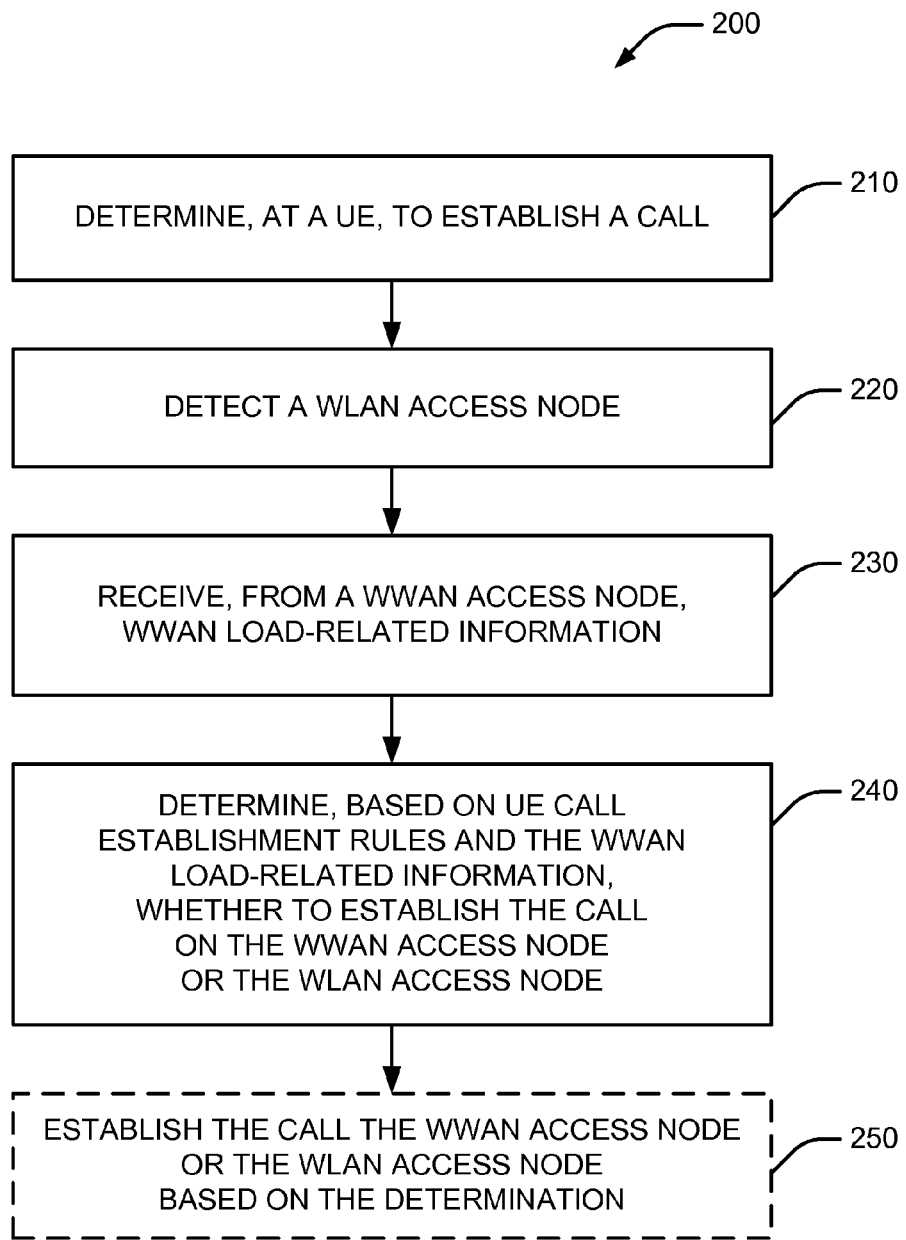
FIG. 2 is a flowchart of an aspect of a method of controlling call establishment performed by a UE having an aspect of a searcher component as described herein.

Referring to FIG. 2, aspects of a method 200 of controlling call establishment may be performed by UE 12 in communication with WWAN access node 18 and/or WLAN access node 30 of FIG. 1. More particularly, aspects of the method 200 may be performed by RAN-assisted call establishment component 14, including call establishment component 20, access node detector 28, and/or RAT determiner 32.

At 210, the method 200 includes determining, at a user equipment, to establish a call. For example, as described above, RAN-assisted call establishment component 14 and/or call establishment component 20 may be configured to determine to establish a call based on a call establishment request 22.

At 220, the method 200 includes detecting a Wireless Local Area Network (WLAN) access node. For example, RAN-assisted call establishment component 14 and/or access node detector 28 may be configured to actively or passively, e.g., according to 802.11x-type standards (which are incorporated herein by reference in their entirety), detect WLAN access node 30.

At 230, the method 200 includes receiving, from a Wireless Wide Area Network (WWAN) access node, WWAN load-related information. For example, UE 12 may include a communications component, such as transceiver or receiver, which operates in conjunction with RAN-assisted call establishment component 14 and/or access node detector 28 to receive a message such as message 38 that includes WWAN load-related information 16. As described above, WWAN load-related information 16 may be specific or relative load parameters or bit (s) such as, for example, WWAN load-related parameters 40 and/or a redirection command 42. In an aspect, receiving the load-related information may include receiving a DL resources utilization, a UL Noise Rise or load-factor, a DL/UL throughput parameter, a current number of users parameter, an available power value, and/or a number of primary synchronization codes. In an aspect, receiving the load-related information may include receiving a relative load indicator, which may be a low indicator, a medium indicator, and/or a high indicator. In an aspect, receiving the load-related information may include receiving a single bit having a value that indicates loaded or not loaded. In an aspect, receiving the load-related information may include receiving a dynamic indicator that changes over time based on load-related information at the WWAN access node 18.

In an aspect, receiving the load-related information may include receiving a redirection command 42 indicating to establish the call with the WLAN access node 30. In the aspect, the UE 12 may be configured to determine WLAN access node characteristics 46 associated with a received signal from the WLAN access node 30 and forward a call establishment request message 38, including the WLAN access node characteristics 46, to the WWAN access node 18, such that UE 12 receives the redirection command 42 in response to the call establishment request message 38 and based on one or more WWAN load-related parameters 40 at the WWAN access node 18. In the aspect, forwarding the call establishment request message 38, including the WLAN access node characteristics 46, may include forwarding one or more additional information elements (IEs), as described in Table 1 above, in the call establishment request message 38.

At 240, the method 200 includes determining, based on user equipment call establishment rules and based on the WWAN load-related information, whether to establish the call on the WWAN access node or the WLAN access node. For example, RAN-assisted call establishment component 14 and/or RAT determiner 32 may be configured to apply WWAN load-related information 16 to one or more UE call establishment rules 34 in order to generate call establishment decision 36. For example, in one case, one or more UE call establishment rules 34 may include one or more thresholds, and may compare or weigh one or more WWAN load-related parameters 40 in order to determine a loading state of WWAN access node 18 and, consequently, whether to direct call establishment to WLAN access node 30. Further, and for example in another case, one or more UE call establishment rules 34 may include a rule or policy to override other considerations upon receipt of redirection command 42 and, in response, direct call establishment to WLAN access node 30.

In an aspect, determining whether to establish the call on the WWAN access node 18 or the WLAN access node 30 based on the UE call establishment rules 34 may include determining on a per-cell, per-UE or per-service basis. In other words, WWAN load-related information 16 and one or more UE call establishment rules 34 may be UE-specific (e.g., applicable only to a given UE), cell-specific (e.g., applicable to all UEs in a given cell), and/or service-specific (e.g., applicable to or based on a specific quality of service class, such as non-delay tolerant or delay tolerant services, etc.). In an aspect, determining whether to establish the call may include determining to establish a packet switched (PS) call when the UE 12 is in an idle mode, or to establish a new call, at UE 12, when UE 12 is in a connected mode.

In an aspect, determining whether to establish the call on the WWAN access node 18 may include determining whether the load-related information meets a cellular load threshold, and, establishing or not establishing the call with the WWAN access node 18 based on whether the WWAN load-related information 16 meets the cellular load threshold. In the aspect, and according to a first example, the UE 12 also may be configured to obtain WLAN load information and determine whether the WLAN load-related information meets a WLAN load threshold, such that determining whether to establish the call on the WWAN access node 18 or the WLAN access node 30 may include establishing or not establishing the call with the WWAN access node 18 based on whether the WWAN load-related information 16 meets the cellular load threshold and based on the WLAN load-related information meets the WLAN load threshold. In the aspect, and according to a second example, the UE 12 may be configured to obtain WWAN quality information and WLAN quality information and determine whether the WWAN quality information and WLAN quality information respectively meet a WWAN quality threshold and a WLAN quality threshold, such that determining whether to establish the call on the WWAN access node or the WLAN access node may include establishing or not establishing the call with the WWAN access node 18 based on whether the WWAN quality information and WLAN quality information respectively meet the WWAN quality threshold and the WLAN quality threshold.

Optionally, at 250, the method 200 includes establishing the call the WWAN access node or the WLAN access node based on the determination. For example, RAN-assisted call establishment component 14 and/or call establishment component 20 may be configured to establish the call on the determined one of WLAN access node 30 or WWAN access node 18.

It should be noted that the aspects of method 200 may be a UE-centric or network-centric operation. In other words, aspects of method 200 may be UE-centric in that the UE 12 may make the call establishment decision based on WWAN load-related information 16, such as one or more WWAN load-related parameters 40, received from the WWAN access node 18. Aspects of method 200 may be network-centric in the sense that the UE 12 may request call establishment with the WWAN access node 18, while including one or more WLAN access node characteristics 46 of one or more WLAN access nodes 30 in the request, but the WWAN access node 18 may instead explicitly direct the UE 12, e.g. based on redirection command 42, to re-attempt the call establishment with a specific one of the WLAN access nodes 30.

Figure 3:
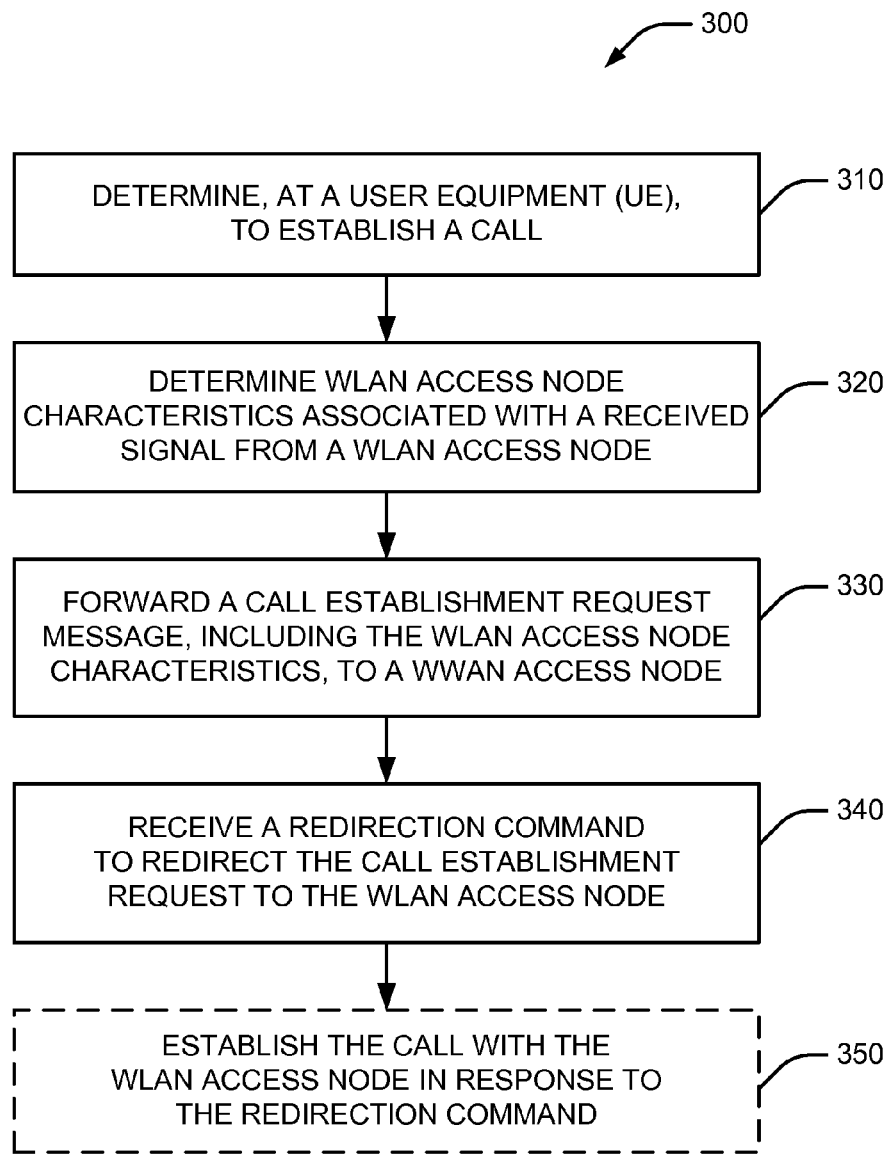
FIG. 3 is a flowchart of another aspect of a method of controlling call establishment performed by a UE having an aspect of a searcher component as described herein.

Referring to FIG. 3, aspects of a method 300 of controlling call establishment may be particular to a network-based WWAN to WLAN redirection at call setup. Aspects of the method 300 may be performed by UE 12 in communication with WWAN access node 18 and/or WLAN access node 30 of FIG. 1. More particularly, aspects of the method 300 may be performed by RAN-assisted call establishment component 14, including call establishment component 20, access node detector 28, and/or RAT determiner 32.

At 310, the method 300 includes determining, at a user equipment, to establish a call. For example, RAN-assisted call establishment component 14 and/or call establishment component 20 may be configured to determine to establish a call based on a call establishment request 22.

At 320, the method 300 includes determining WLAN access node characteristics associated with a received signal from a WLAN access node. For example, RAN-assisted call establishment component 14 and/or access node detector 28 may be configured to obtain one or more WLAN access node characteristics 46 based on active or passive scanning for WLAN access nodes.

At 330, the method 300 includes forwarding a call establishment request, including the WLAN access node characteristics, to a WWAN access node. For example, RAN-assisted call establishment component 14 and/or call establishment component 20 may be configured to generate and transmit call establishment request message 44, including the one or more WLAN access node characteristics 46, to WWAN access node 18. Optionally, call establishment request message 44 also may include one or more WWAN access node characteristics 48, obtained by, for example, access node detector 28 and/or another communication component, e.g., a transceiver or receiver of UE 12, by measuring or determining characteristics or parameters of WWAN access node 18 based on received signals.

At 340, the method 300 includes receiving a redirection command to redirect the call establishment request to the WLAN access node. For example, RAN-assisted call establishment component 14, call establishment component 20, and/or another communication component, e.g., a transceiver or receiver, may be configured to receive message 38, which may include WWAN load-related information 16 in the form of redirection command 42. In response to receiving message 38, RAN-assisted call establishment component 14, RAT determiner 32, and/or call establishment component 20 may be configured to override other considerations, such as, for example, other UE call establishment rules 34, and direct the call establishment to occur with WLAN access node 30. In an aspect, as a result of call establishment determiner 50 at WWAN access node 18 determining that a current loading of WWAN access node 18 is high enough that redirection of a call establishment request of UE 12 to WLAN access node 30 is warranted, WWAN access node 18 may be configured to send call establishment request message 38, including redirection command 42, to UE 12.

Optionally, at 350, the method 300 includes establishing the call with the WLAN access node in response to the redirection command. For example, RAN-assisted call establishment component 14 and/or call establishment component 20 may be configured to establish the call on WLAN access node 30 in response to the UE 12 receiving redirection command 42.

Figure 4:
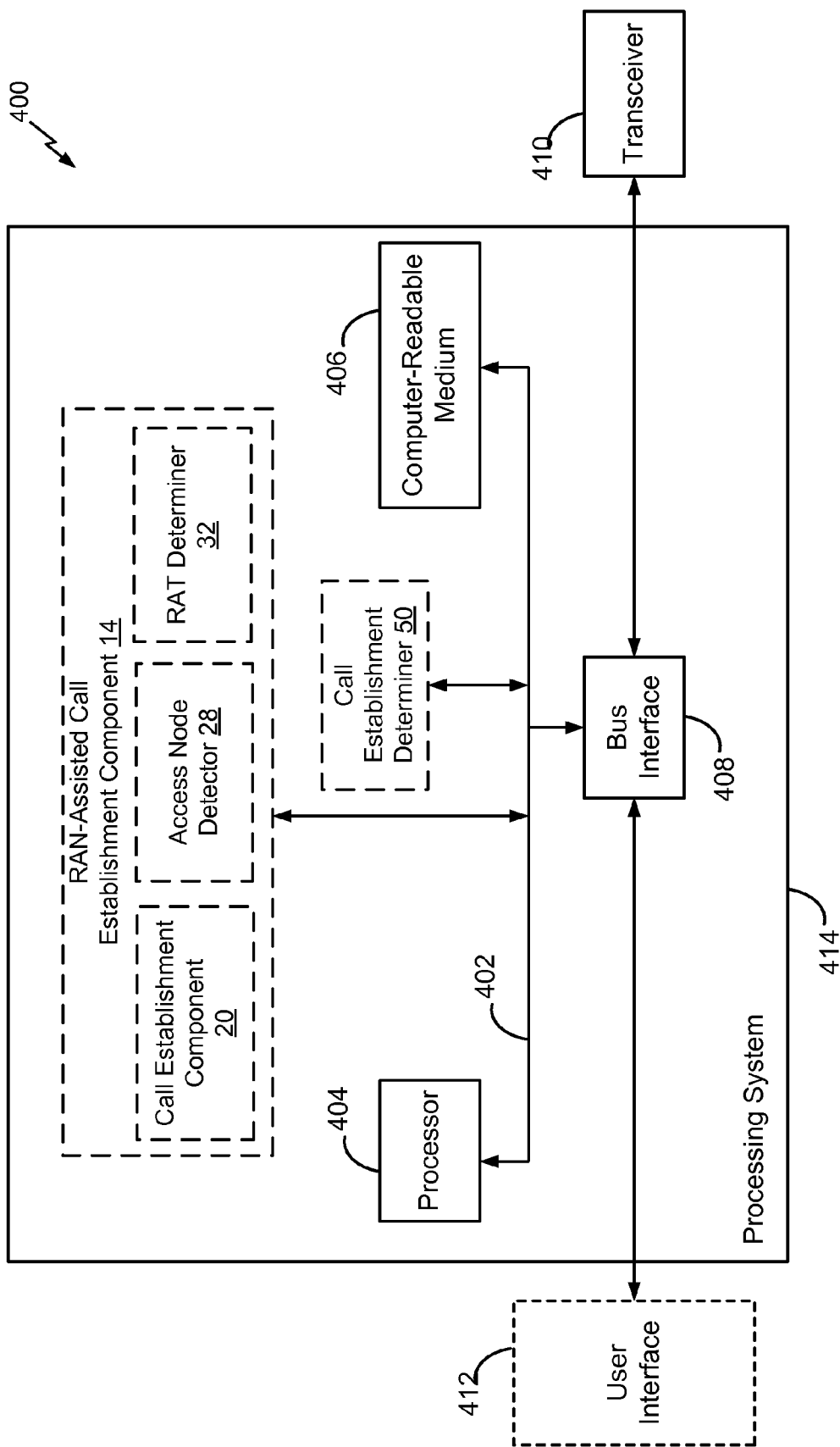
FIG. 4 is a diagram illustrating an example of a hardware implementation for an apparatus employing a processing system including the call establishment controlling components described herein.

FIG. 4 is a block diagram illustrating an example of a hardware implementation for an apparatus 400 employing a processing system 414, wherein apparatus 400 may be UE 12, including RAN-assisted call establishment component 14, of FIG. 1, and/or WWAN access node 18, including call establishment determiner 50, also of FIG. 1. In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, and computer-readable media, represented generally by the computer-readable medium 406. In an aspect where processing system 414 is UE 12 of FIG. 1, the bus 402 also links RAN-assisted establishment component 14, including call establishment component 20, access node detector 28, and RAT determiner 32, to one another and to processor 404 and computer-readable medium 406. In an aspect where processing system 414 is WWAN access node 18, the bus 402 also links call establishment determiner 50 to processor 404 and computer-readable medium 406. In addition or in the alternative, the functionality of RAN-assisted call establishment component 14, including the functionality of call establishment component 20, access node detector 28, and RAT determiner 32, and/or the functionality of call establishment determiner 50, may be implemented by any one or any combination of processor 404 and computer-readable medium 406.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described herein for any particular apparatus, e.g., UE 12 of FIG. 1 and/or WWAN access node 18, also of FIG. 1. The computer-readable medium 406 may also be used for storing data that is manipulated by the processor 404 when executing software.

The various concepts presented throughout this disclosure may be implemented across a broad variety of telecommunication systems, network architectures, and communication standards.

Figure 5:
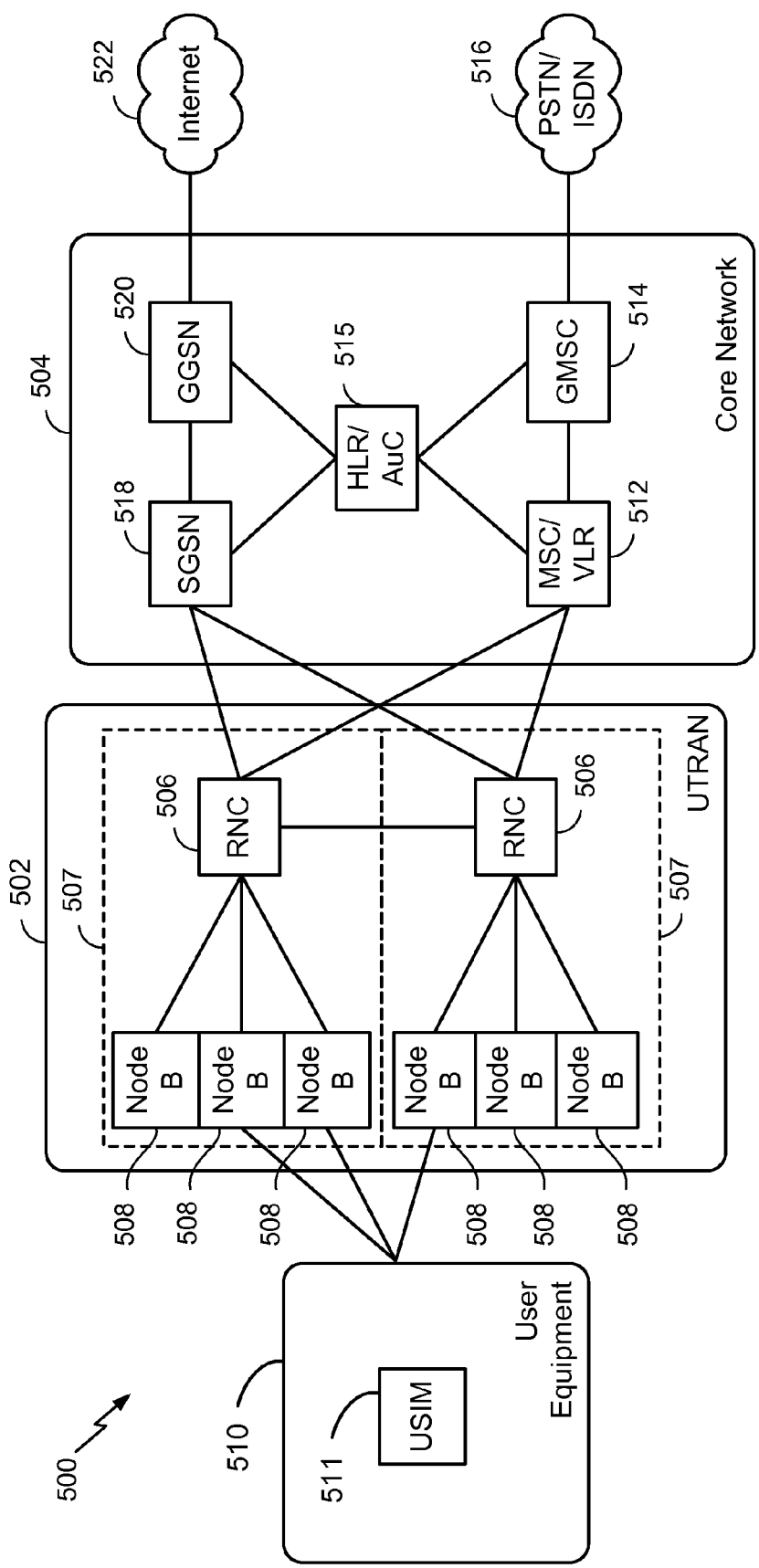
FIG. 5 is a diagram illustrating an example of a telecommunications system including a UE and/or Node B having the call establishment controlling components described herein.

Referring to FIG. 5, by way of example and without limitation, the aspects of the present disclosure are presented with reference to a UMTS system 500 employing a W-CDMA air interface. A UMTS network includes three interacting domains: a Core Network (CN) 504, a UMTS Terrestrial Radio Access Network (UTRAN) 502 including Node Bs 508, and User Equipment (UE) 510. For example, UE 510 and Node Bs 508 respectively may be the same as or similar to UE 12, including RAN-assisted call establishment component 14, of FIG. 1, and/or WWAN access node 18, including call establishment determiner 50, also of FIG. 1. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508 may be considered as including a physical (PHY) layer and a medium access control (MAC) layer. Further, communication between a UE 510 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 507; however, the RNSs 507 may include any number of wireless Node Bs. The Node Bs 508 provide wireless access points to a CN 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The DL, also called the forward link, refers to the communication link from a Node B 508 to a UE 510, and the UL, also called the reverse link, refers to the communication link from a UE 510 to a Node B 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support Node (SGSN) 518 and a gateway GPRS support Node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 510 provides feedback to the Node B 508 over the HS-DPCCH to indicate whether it correctly decoded a packet on the downlink.

HS-DPCCH further includes feedback signaling from the UE 510 to assist the Node B 508 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 508 and/or the UE 510 may have multiple antennas supporting MIMO technology. The use of MIMO technology enables the Node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 510 to increase the data rate or to multiple UEs 510 to increase the overall system capacity. This is achieved by spatially precoding each data stream and then transmitting each spatially precoded stream through a different transmit antenna on the downlink. The spatially precoded data streams arrive at the UE(s) 510 with different spatial signatures, which enables each of the UE(s) 510 to recover the one or more the data streams destined for that UE 510. On the uplink, each UE 510 may transmit one or more spatially precoded data streams, which enables the Node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
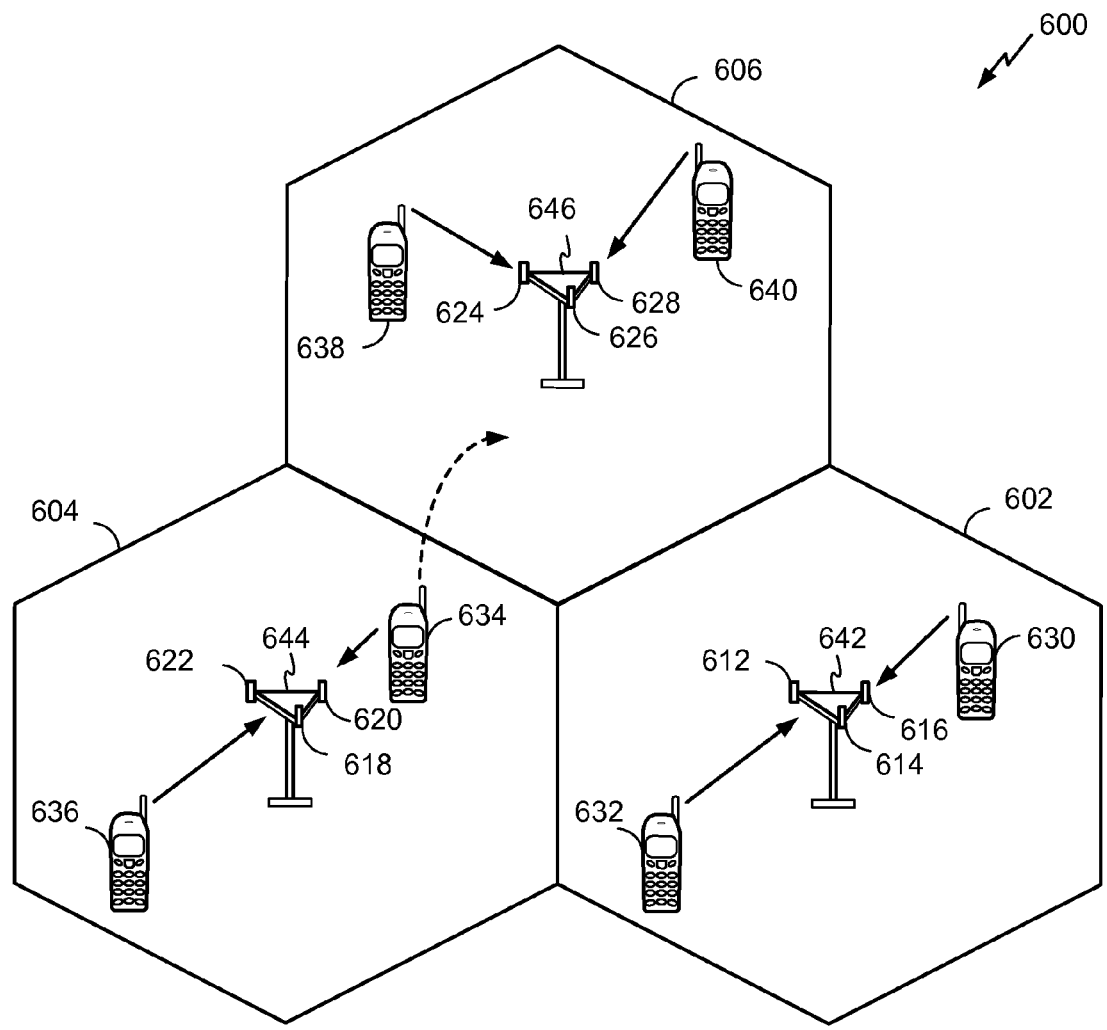
FIG. 6 is a diagram illustrating an example of an access network including a UE and/or Node B having the call establishment controlling components described herein.

Referring to FIG. 6, an access network 600 in a UTRAN architecture is illustrated including one or more UEs 630, 632, 634, 636, 638, 640 and one or more Node B 642, 644, 646 that respectively may be configured the same as or similar to UE 12, including RAN-assisted call establishment component 14, of FIG. 1, and/or WWAN access node 18, including call establishment determiner 50, also of FIG. 1. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. Here, each Node B 642, 644, 646 is configured to provide an access point to a CN 504 (see FIG. 5) for all the UEs 630, 632, 634, 636, 638, 640 in the respective cells 602, 604, and 606.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable Node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 7.

Figure 7:
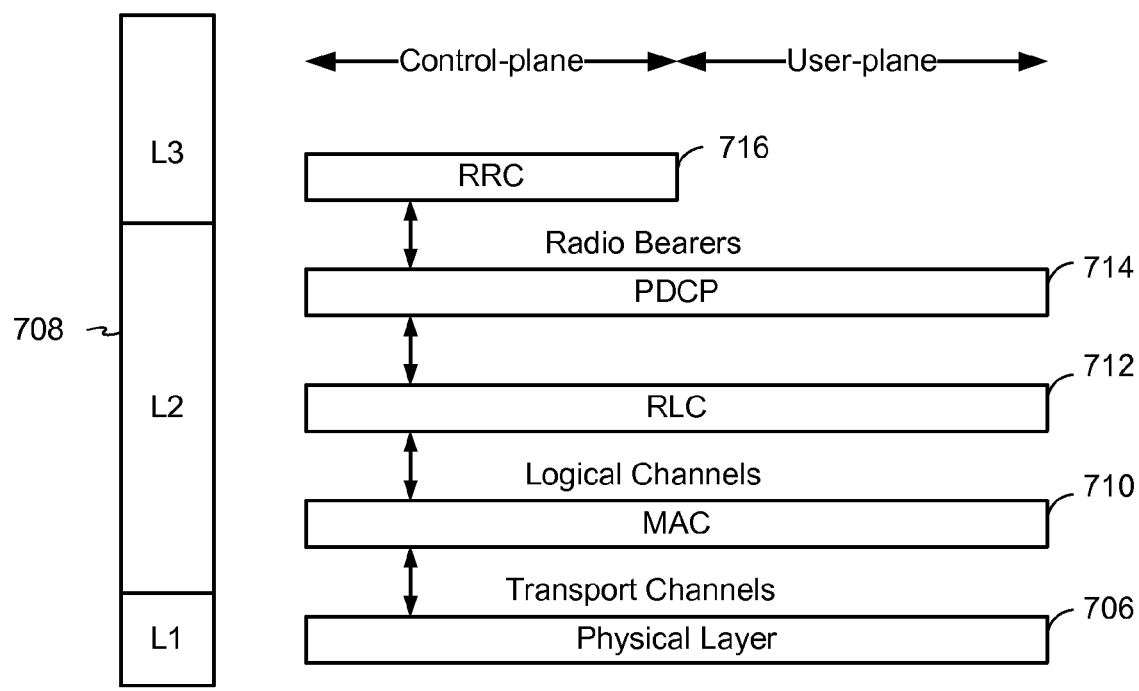
FIG. 7 is a diagram illustrating an example of a radio protocol architecture for a user and control plane that may be utilized by the UE and/or access nodes as described herein.

Referring to FIG. 7, an example radio protocol architecture 700 relates to the user plane 702 and the control plane 704 of a user equipment (UE) or Node B/base station. For example, architecture 700 may be included in UE 12, including RAN-assisted call establishment component 14, of FIG. 1, and/or WWAN access node 18, including call establishment determiner 50, also of FIG. 1. The radio protocol architecture 700 for the UE and Node B is shown with three layers: Layer 1 706, Layer 2 708, and Layer 3 710. Layer 1 706 is the lowest lower and implements various physical layer signal processing functions. As such, Layer 1 706 includes the physical layer 707. Layer 2 (L2 layer) 708 is above the physical layer 707 and is responsible for the link between the UE and Node B over the physical layer 707. Layer 3 (L3 layer) 710 includes a radio resource control (RRC) sublayer 715. The RRC sublayer 715 handles the control plane signaling of Layer 3 between the UE and the UTRAN.

In the user plane, the L2 layer 708 includes a media access control (MAC) sublayer 709, a radio link control (RLC) sublayer 711, and a packet data convergence protocol (PDCP) 713 sublayer, which are terminated at the Node B on the network side. Although not shown, the UE may have several upper layers above the L2 layer 708 including a network layer (e.g., IP layer) that is terminated at a PDN gateway on the network side, and an application layer that is terminated at the other end of the connection (e.g., far end UE, server, etc.).

The PDCP sublayer 713 provides multiplexing between different radio bearers and logical channels. The PDCP sublayer 713 also provides header compression for upper layer data packets to reduce radio transmission overhead, security by ciphering the data packets, and handover support for UEs between Node Bs. The RLC sublayer 711 provides segmentation and reassembly of upper layer data packets, retransmission of lost data packets, and reordering of data packets to compensate for out-of-order reception due to hybrid automatic repeat request (HARQ). The MAC sublayer 709 provides multiplexing between logical and transport channels. The MAC sublayer 709 is also responsible for allocating the various radio resources (e.g., resource blocks) in one cell among the UEs. The MAC sublayer 709 is also responsible for HARQ operations.

Figure 8:
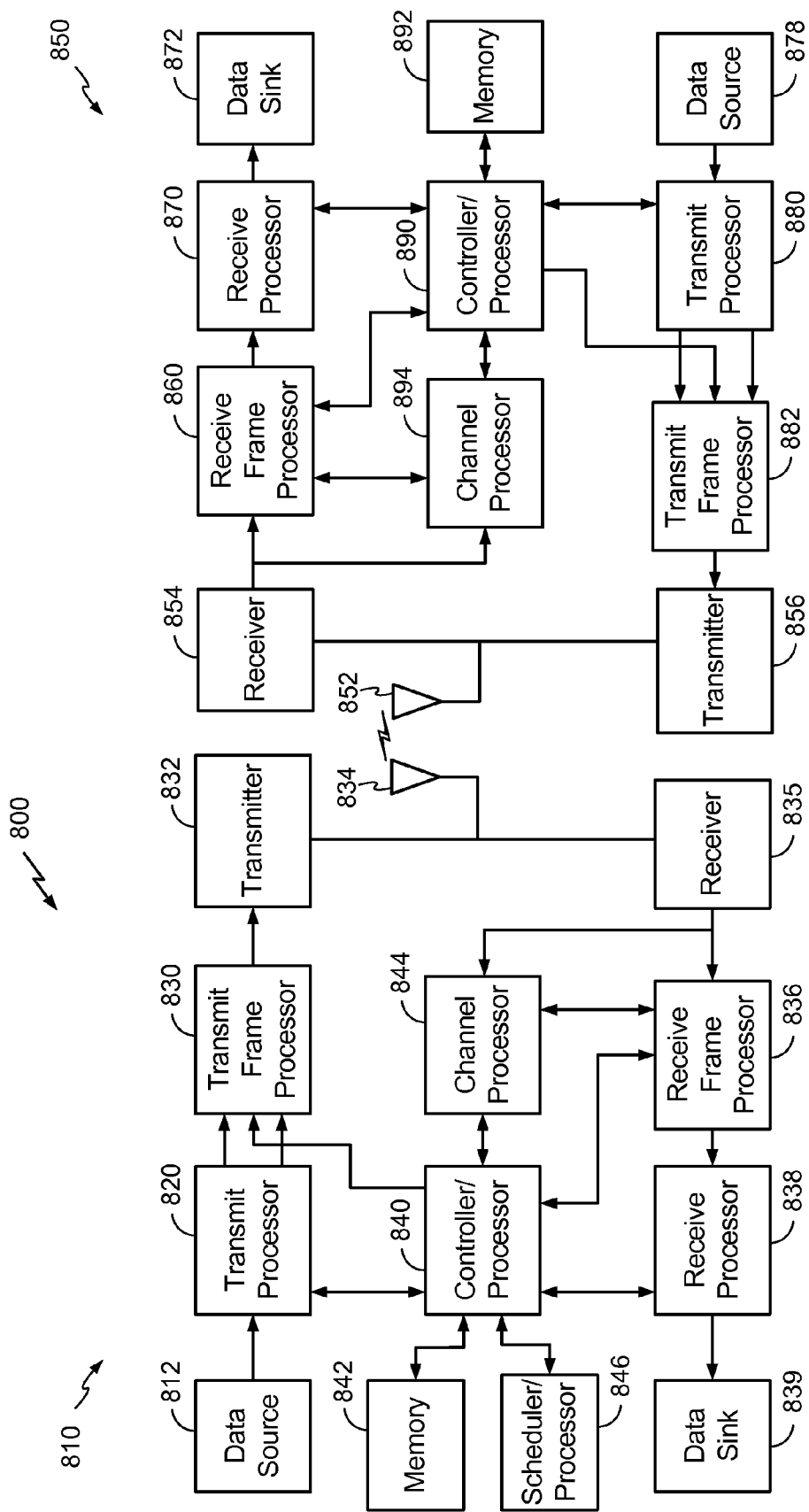
FIG. 8 is a diagram conceptually illustrating an example of a Node B in communication with a UE in a telecommunications system, where the Node B and UE may be the same as or similar to the access nodes and UE, respectively, of FIG. 1.

Referring to FIG. 8, an aspect of a Node B 810 in communication with a UE 850 is illustrated, where UE 850 and Node B may be the same as or similar to UE 12, including RAN-assisted call establishment component 14, of FIG. 1, and/or WWAN access node 18, including call establishment determiner 50, also of FIG. 1 as described herein and implemented within a processor or memory. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of controlling call establishment, comprising:
   determining, at a user equipment, to establish a new packet switched call when the user equipment is in an idle mode and camped on a Wireless Wide Area (WWAN) access node;
   detecting a Wireless Local Area Network (WLAN) access node;
   receiving, from the WWAN access node, WWAN load-related information;
   determining, based on user equipment call establishment rules and based on the WWAN load-related information, an access node on which to establish the new packet switched call, the access node being one of the WWAN access node or the WLAN access node;
   establishing the new packet switched call using the determined access node; and
   wherein the establishing the new packet switched call using the determined access node includes establishing the new packet switched call using the WLAN access node without setup of a radio bearer with the WWAN access node.

2. The method of claim 1, wherein receiving the load-related information further comprises receiving at least one of a DL resources utilization, an UL Noise Rise or load-factor, a DL/UL throughput parameter, a current number of users parameter, an available power value, or a number of primary synchronization codes.

3. The method of claim 1, wherein receiving the load-related information further comprises receiving at least one of a relative load indicator.

4. The method of claim 3, wherein receiving the relative load indicator includes receiving one of a low indicator, a medium indicator, or a high indicator.

5. The method of claim 1, wherein receiving the load-related information further comprises receiving a single bit, wherein a value of the single bit indicates loaded or not loaded.

6. The method of claim 1, wherein receiving the load-related information further comprises receiving a dynamic indicator that changes over time based on load-related information at the WWAN access node.

7. The method of claim 1, wherein receiving the load-related information further comprises receiving a command indicating to establish the new packet switched call with the WLAN access node.

8. The method of claim 1, wherein determining to establish the new packet switched call on the WWAN access node further comprises determining whether the load-related information meets a cellular load threshold, and establishing or not establishing the new packet switched call with the WWAN access node based on whether the WWAN load-related information meets the cellular load threshold.

9. The method of claim 8, further comprising:
obtaining WLAN load information; and
determining whether the WLAN load-related information meets a WLAN load threshold; and
wherein determining establish the new packet switched call on the WWAN access node or the WLAN access node further comprises establishing or not establishing the new packet switched call with the WWAN access node based on whether the WWAN load-related information meets the cellular load threshold and based on whether the WLAN load-related information meets the WLAN load threshold.

10. The method of claim 8, further comprising:
obtaining WWAN quality information and WLAN quality information;
determining whether the WWAN quality information and WLAN quality information respectively meet a WWAN quality threshold and a WLAN quality threshold; and
wherein determining to establish the new packet switched call on the WWAN access node or the WLAN access node further comprises establishing or not establishing the new packet switched call with the WWAN access node based on whether the WWAN quality information and WLAN quality information respectively meet the WWAN quality threshold and the WLAN quality threshold.

11. The method of claim 1, wherein determining based on the user equipment call establishment rules comprises determining per cell, per UE or per service.

12. A non-transitory computer-readable medium comprising: code for causing a computer to:
determine, at a user equipment, to establish a new packet switched call when the user equipment is in an idle mode and camped on a Wireless Wide Area Network (WWAN) access node;
detect a Wireless Local Area Network (WLAN) access node;
receive, from the WWAN access node, WWAN load-related information;
determine, based on user equipment call establishment rules and based on the WWAN load-related information, an access node on which to establish the new packet switched call, the access node being one of the WWAN access node or the WLAN access node;
establish the new packet switched call using the determined access node; and
wherein the establishing the new packet switched call using the determined access node includes establishing the new packet switched call using the WLAN access node without setup of a radio bearer with the WWAN access node.

13. An apparatus for controlling call establishment, comprising:
means for determining, at a user equipment, to establish a new packet switched call when the user equipment is in an idle mode and camped on a Wireless Wide Area Network (WWAN) access node;
means for detecting a Wireless Local Area Network (WLAN) access node;
means for receiving, from the WWAN access node, WWAN load-related information;
means for determining, based on user equipment call establishment rules and based on the WWAN load-related information, an access node on which to establish the new packet switched call, the access node being one of the WWAN access node or the WLAN access node;
means for establishing the new packet switched call using the determined access node and
wherein the establishing the new packet switched call using the determined access node includes establishing the new packet switched call using the WLAN access node without setup of a radio bearer with the WWAN access node.

14. An apparatus for controlling call establishment, comprising:
a transceiver;
a memory storing executable instructions; and
a processor in communication with the memory, wherein the processor is configured to execute the instructions to:
determine, at a user equipment, to establish a new packet switched call when the user equipment is in an idle mode and camped on a Wireless Wide Area Network (WWAN) access node;
detect, via the transceiver, a Wireless Local Area Network (WLAN) access node;
receive, from a Wireless Wide Area Network (WWAN) access node, via the transceiver, WWAN load-related information;
determine, based on user equipment call establishment rules and based on the WWAN load-related information, an access node on which to establish the new packet switched call, the access node being one of the WWAN access node or the WLAN access node;
establish the new packet switched call using the determined access node; and
wherein the establishing the new packet switched call using the determined access node includes establishing the new packet switched call using the WLAN access node without setup of a radio bearer with the WWAN access node.

15. The apparatus of claim 14, wherein the processor is configured to receive at least one of a DL resources utilization, an UL Noise Rise or load-factor, a DL/UL throughput parameter, a current number of users parameter, an available power value, or a number of primary synchronization codes.

16. The apparatus of claim 14, wherein the processor is configured to receive at least one of a relative load indicator.

17. The apparatus of claim 16, wherein the processor is configured to receive one of a low indicator, a medium indicator, or a high indicator.

18. The apparatus of claim 14, wherein the processor is configured to receive a single bit, wherein a value of the single bit indicates loaded or not loaded.

19. The apparatus of claim 14, wherein the processor is configured to receive a dynamic indicator that changes over time based on load-related information at the WWAN access node.

20. The apparatus of claim 14, wherein the processor is configured to receive a command indicating to establish the call with the WLAN access node.

21. The apparatus of claim 1, wherein the processor is configured to determine whether the load-related information meets a cellular load threshold, and establish or not establish the new packet switched call with the WWAN access node based on whether the WWAN load-related information meets the cellular load threshold.

22. The apparatus of claim 21, wherein the processor is further configured to:

obtain WLAN load information, and determine whether the WLAN load-related information meets a WLAN load threshold, and establish or not establish the new packet switched call with the WWAN access node based on whether the WWAN load-related information meets the cellular load threshold and based on whether the WLAN load-related information meets the WLAN load threshold.

23. The apparatus of claim 21, wherein the processor is further configured to:

obtain WWAN quality information and WLAN quality information, and determine whether the WWAN quality information and WLAN quality information respectively meet a WWAN quality threshold and a WLAN quality threshold, and establish or not establish the new packet switched call with the WWAN access node based on whether the WWAN quality information and WLAN quality information respectively meet the WWAN quality threshold and the WLAN quality threshold.

24. The apparatus of claim 14, wherein the processor is configured to determine user equipment call establishment rules per cell, per UE or per service.

\* \* \* \* \*